(12) United States Patent
Li et al.

(10) Patent No.: US 11,729,862 B2
(45) Date of Patent: Aug. 15, 2023

(54) TRANSMITTING DEVICE AND RECEIVING DEVICE FOR BUNDLED TRANSMISSION OF PACKETS IN WIRELESS COMMUNICATIONS FOR VEHICLES AND TRANSPORT SYSTEMS

(71) Applicant: Huawei Technologies Co., Ltd., Shenzhen (CN)

(72) Inventors: Zhongfeng Li, Shanghai (CN); Yilin Li, Munich (DE); Jian Luo, Munich (DE); Richard Stirling-Gallacher, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 103 days.

(21) Appl. No.: 17/074,164

(22) Filed: Oct. 19, 2020

(65) Prior Publication Data
US 2021/0037603 A1 Feb. 4, 2021

Related U.S. Application Data

(63) Continuation of application No. PCT/EP2018/076006, filed on Sep. 25, 2018.

(30) Foreign Application Priority Data

Apr. 19, 2018 (WO) ............... PCT/EP2018/060055

(51) Int. Cl.
*H04W 72/04* (2023.01)
*H04W 88/06* (2009.01)
(Continued)

(52) U.S. Cl.
CPC ........... *H04W 88/06* (2013.01); *H04L 1/1819* (2013.01); *H04L 5/0048* (2013.01);
(Continued)

(58) Field of Classification Search
CPC . H04W 88/06; H04W 88/10; H04W 72/0413; H04W 72/0446; H04L 1/1819; H04L 1/189; H04L 5/0048; H04L 5/0055
See application file for complete search history.

(56) References Cited

U.S. PATENT DOCUMENTS 6,567,388 B1   5/2003 Tomcik et al.
11,272,387 B2 * 3/2022 Schrammar .......... H04B 17/318
(Continued)

FOREIGN PATENT DOCUMENTS

CN          1349694 A       5/2002
CN        104770039 A       7/2015
(Continued)

OTHER PUBLICATIONS

"Summary of QCL," 3GPP TSG RAN WG1#92, Athens, Greece, R1-1803328,, pp. 1-31, 3rd Generation Partnership Project, Valbonne, France (Feb. 26-Mar. 2, 2018).
(Continued)

*Primary Examiner* — Mahbubul Bar Chowdhury
(74) *Attorney, Agent, or Firm* — Leydig, Voit & Mayer, Ltd.

(57) ABSTRACT

The present disclosure presents a transmitting device and receiving device for wireless communications, particularly for vehicle-to-everything V2X or cooperative intelligent transport systems (C-ITS) communications. The transmitting device is configured to determine more than one transmission for transmitting a packet, and transmit the packet to a receiving device and/or a group of receiving devices using the determined transmissions. The receiving device is configured to receive a packet in more than one transmission from a transmitting device, and combine the transmissions to obtain the packet. The disclosure also relates to corresponding transmitting and receiving methods.

15 Claims, 15 Drawing Sheets

(51) Int. Cl.
*H04L 1/1812* (2023.01)
*H04L 5/00* (2006.01)
*H04W 72/0446* (2023.01)
*H04W 88/10* (2009.01)
*H04W 72/21* (2023.01)

(52) U.S. Cl.
CPC ....... *H04L 5/0055* (2013.01); *H04W 72/0446* (2013.01); *H04W 72/21* (2023.01); *H04W 88/10* (2013.01)

(56) References Cited

U.S. PATENT DOCUMENTS

| | | | |
|---|---|---|---|
| 2010/0271999 A1* | 10/2010 | Yu | H04L 1/16 370/312 |
| 2015/0365924 A1 | 12/2015 | Gao et al. | |
| 2016/0374068 A1* | 12/2016 | Kim | H04W 4/70 |
| 2017/0048905 A1 | 2/2017 | Yun et al. | |
| 2017/0214495 A1 | 7/2017 | Golitschek Edler Von Elbwart et al. | |
| 2018/0288748 A1* | 10/2018 | Horn | H04W 48/12 |
| 2020/0059821 A1* | 2/2020 | Wirth | H04L 1/1896 |
| 2020/0136680 A1* | 4/2020 | Kim | H04B 7/0408 |
| 2020/0145079 A1* | 5/2020 | Marinier | H04L 5/0051 |
| 2020/0146039 A1* | 5/2020 | Takeda | H04W 74/08 |
| 2020/0154400 A1* | 5/2020 | Byun | H04L 5/00 |
| 2020/0305152 A1* | 9/2020 | Yasukawa | H04W 92/18 |
| 2021/0084596 A1* | 3/2021 | Lee | H04W 52/143 |
| 2021/0084618 A1* | 3/2021 | Bienas | H04L 5/0055 |
| 2021/0084640 A1* | 3/2021 | Kang | H04B 7/00 |
| 2021/0194641 A1* | 6/2021 | Liu | H04L 1/1887 |
| 2021/0250129 A1* | 8/2021 | Ljung | H04L 1/189 |
| 2021/0368453 A1* | 11/2021 | Lee | H04W 72/0413 |
| 2022/0200765 A1* | 6/2022 | Wong | H04W 72/0446 |

FOREIGN PATENT DOCUMENTS

| | | |
|---|---|---|
| CN | 105450367 A | 3/2016 |
| CN | 107005986 A | 8/2017 |
| CN | 107046453 A | 8/2017 |
| CN | 107302796 A | 10/2017 |
| CN | 107342851 A | 11/2017 |
| CN | 107359966 A | 11/2017 |
| CN | 107769888 A | 3/2018 |
| WO | 0052873 A2 | 9/2000 |

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 15)," 3GPP TS 36.321 V15.1.0, pp. 1-109, 3rd Generation Partnership Project, Valbonne, France (Mar. 2018).

"Discussion on multiple transmissions in multiple carriers," 3GPP TSG-RAN WG4 Meeting #85, R4-1712982, Reno, US, XP051374502, Total 3 pages, 3rd Generation Partnership Project, Valbonne, France (Nov. 27-Dec. 1, 2017).

* cited by examiner

TRANSMITTING DEVICE AND RECEIVING DEVICE FOR BUNDLED TRANSMISSION OF PACKETS IN WIRELESS COMMUNICATIONS FOR VEHICLES AND TRANSPORT SYSTEMS

CROSS-REFERENCE TO RELATED APPLICATIONS

This application is a continuation of International Application No. PCT/EP2018/076006, filed on Sep. 25, 2018, which claims priority to International Patent Application No. PCT/EP2018/060055, filed on Apr. 19, 2018. The disclosures of the aforementioned applications are hereby incorporated by reference in their entireties.

TECHNICAL FIELD

The present disclosure relates to the field of wireless communications, particularly to vehicle-to-everything (V2X), e.g. vehicle-to-vehicle (V2V), vehicle-to-infrastructure, and/or vehicle-to-pedestrian, communications, or to Cooperative Intelligent Transport Systems (C-ITS) communications. The present disclosure specifically presents a transmitting device for such wireless communications, a receiving device for such wireless communications, and corresponding transmitting and receiving methods.

BACKGROUND

There is a need for capable wireless communication systems, especially V2X or C-ITS communication systems, in order to support e.g. the increasing need for vehicle safety, traffic management, and different levels of assistance for automated driving. However, several challenges still need to be addressed to reach this goal, in particular:

1. More sufficient coverage and reliability for V2X communications needs to be assured, particularly a better communication quality.
2. More efficient multicast transmissions need to be enabled, in order to support e.g. high-definition map download, software download, traffic information, real-time position etc.

Conventional V2X in Long Term Evolution (LTE) does not yet adequately address these challenges. While the conventional V2X provides up to two transmissions for a packet, including one blind retransmissions to somewhat enhance the coverage or reliability, it has still the following shortcomings:

1. Its flexibility and coverage/reliability are not yet sufficient.
2. Communication quality is also not yet good enough, in particular because no beamforming is yet considered.
3. No feedback mechanism is provided, but only a blind retransmission. In particular, conventional LTE V2X (see e.g. TS 36.321) provides multicast transmissions, but there is no flexible Hybrid Automatic Repeat Request (HARQ) retransmission supported for this multicast transmission. Further, usually a very conservative Modulation and Coding Scheme (MCS) is used. As a consequence, the efficiency is still too low.

An approach for improving the conventional V2X provides a multicast feedback with a shared channel. However, neither a beamforming impact and nor an impact on the increased inter-cell interference are considered by this approach.

Another approach for improving the conventional V2X provides simultaneous negative-acknowledgement (NACK) transmissions from more than one receiving node. However, the approach does not consider the beamforming impact, and also not the impact on the increased inter-cell interference.

Another approach for improving the conventional V2X provides multicast transmissions in a local cluster. However, the approach does not consider gNodeB (gNB) or Base Station (BS) or roadside unit (RSU) or user equipment (UE) multicast with beamforming transmission to a destination device, and also not any operation of relaying beam information and HARQ-acknowledgment (ACK) or NACK information.

SUMMARY

In view of the above-mentioned challenges and disadvantages, the present disclosure aims to improve conventional wireless communications, particularly conventional V2X and/or C-ITS. The present disclosure provides for improved communications particularly in terms of flexibility, coverage/reliability and efficiency. Furthermore, the present disclosure considers beamforming. Additionally, the present disclosure provides a feedback mechanism. To this end, the present disclosure provides a transmitting device and a receiving device for wireless communications, respectively, which achieve these improvements.

In particular the present disclosure proposes multiple transmissions (transmission bundling) for a packet to be sent from a transmitting device to a receiving device or to a group of receiving devices. In particular, the multiple transmissions may have more than one quasi-co-location (QCL) assumptions, and may, in this disclosure be unicast, multicast, broadcast, or groupcast transmissions.

A first aspect of the present disclosure provides a transmitting device for wireless communications, the transmitting device being configured to determine more than one transmission for transmitting a packet; transmit the packet to a receiving device and/or a group of receiving devices using the determined transmissions.

The transmitting device can in particular be configured for V2X or C-ITS communications. For instance, the transmitting device can be (or be implemented in) a BS or a C-ITS communication system, and may be configured to communicate with a plurality of User Equipments (UEs) and/or vehicles.

Since according to the transmitting device of the first aspect, multiple transmissions are determined in advance and are then used for transmitting one and the same packet to the receiving device and/or group of receiving devices, the coverage and reliability of sending the packet is significantly enhanced. The device of the first aspect can, for example, send the multiple transmissions as different beams. Accordingly, beamforming is supported for improved communication quality. By determining the multiple transmissions beforehand of transmitting the packet, the coverage and flexibility are further improved.

In an implementation form of the first aspect, each transmission is allocated a resource set, and a resource set includes at least one time resource, frequency resource, code resource, and/or spatial resource.

A resource set can comprise one or more resources. In particular each transmission is allocated a different resource set. For instance, each transmission is allocated to a different spatial resource, in particular a different beam.

As an example, each transmission may be sent in a different time slot. In particular, in case of beamforming, each transmission may be a transmission beam that is sent in a different beam slot. The resource set, e.g. the beam slots, which are used for transmitting the same packet, can also be referred to as bundled resources, e.g. bundled beam slots. An improved redundancy and block error rate (BLER) are the benefit.

In a further implementation form of the first aspect, the transmitting device is further configured to determine a number of transmissions, in particular determine the number of transmissions depending on whether the packet is initially transmitted or retransmitted to the receiving device and/or group of receiving devices.

This flexible bundling of the transmissions leads to a reduced overhead, and may improve also the multiplexing gain, since other (not bundled or other bundling) transmissions could be used for transmitting different packets.

In a further implementation form of the first aspect, the packet is a transmission block, particularly from a Media Access Control (MAC) layer, and/or a code block.

In a further implementation from the first aspect, each determined transmission is associated with an antenna port, wherein an antenna port has a determined Quasi Co-Location (QCL) assumption with respect to a reference antenna port and/or each determined transmission serves as a reference antenna port.

Thus, each transmission may be represented by a different QCL assumption from the perspective of the receiving device(s). An antenna port may alternatively serve as a reference antenna port. This can be used e.g. for the dedicated PHY channel, e.g. Physical Broadcast Channel (PBCH).

In a further implementation form of the first aspect, the transmitting device is further configured to signal information to the receiving device and/or group of receiving devices, wherein the information includes at least one of: a QCL assumption and/or a spatial relationship, a number of transmissions, a periodicity of the transmissions.

A QCL assumption may be defined in that two antenna reports are considered to be quasi-cold located, if the large-scale properties of the channel, over which a symbol on one antenna port is conveyed, can be inferred from the channel, over which a symbol on the other antenna port is conveyed. The large-scale properties may include one or more of: Delay spread, Doppler spread, Doppler shift, average gain, average delay, and spatial Rx parameters.

A spatial relationship can defined between two antenna ports. Usually, a spatial relationship is used between one Tx antenna port and the reference antenna port. Such spatial relationship may mean that the transmitting device assumes same Tx beams or the same Tx beam as Rx beam between two antenna ports.

In further implementation form of the first aspect, the transmitting device is further configured to signal information to the receiving device and/or group of receiving devices, wherein the information includes at least one of: an indication whether QCL assumptions and/or spatial relationship are enabled, an indication whether QCL assumptions are the same for antenna ports associated with different determined transmission, at least one QCL assumption, QCL parameter and/or QCL type for the determined transmission.

The transmitting device may use the information, e.g. the QCL assumptions and/or spatial relationship, for configuring its transmission. In this way, the coverage and efficiency is further improved.

In a further implementation form of the first aspect, the transmitting device is further configured to signal information to the receiving device and/or group of receiving devices, wherein the information includes at least one of: a resource set for more than one transmission, a resource set for a control channel of more than one transmission.

As mentioned above, a resource set can comprise one or more resources, in particular at least one of a time resource, frequency resource, code resource, and/or spatial resource. Accordingly, the signaling can also comprise allocation information.

In a further implementation form of the first aspect, the transmitting device is further configured to signal information to the receiving device and/or group of receiving devices, wherein the information includes at least one of: an ID or index range of the determined transmissions; an ID of the receiving device and/or group of receiving devices.

In this way, the reliability of the wireless communications, as well as the coverage and efficiency are improved.

In a further implementation form of the first aspect, the transmitting device is further configured to signal information to the receiving device and/or group of receiving devices, wherein the information includes at least one of: an indication whether a Hybrid Automatic Repeat Request (HARQ) process is enabled for the determined transmissions; a HARQ process number and/or maximum HARQ process number for the determined transmissions.

This implementation form enables a feedback mechanism, and leads thus to an improvement of the efficiency.

In a further implementation form of the first aspect, the transmitting device is further configured to signal one or more than one resource set to the receiving device and/or group of receiving devices, wherein the resource set includes at least one of: time resource, frequency resource, code resource, and/or spatial resource.

In a further implementation form of the first aspect, the transmitting device is further configured to signal information to the receiving device and/or group of receiving devices, wherein the information includes at least one of: resource set for more than one transmission, resource set for control channel of more than one transmission.

In a further implementation form of the first aspect, the transmitting device is further configured to receive feedback information, particularly HARQ feedback information including NACK and/or ACK, from the receiving device and/or group of receiving devices, respectively, in a determined resource, and determine a retransmission of the packet and/or a number of transmissions for retransmission of the packet based on the feedback information.

By implementing the feedback mechanism like this at the transmitting device, the reliability and efficiency of the wireless communications are improved. The first aspect as such is particularly combinable with this implementation form in that multiple transmissions may be determined by the transmitting device for initially transmitting the packet, and one transmission may be determined by the transmitting device, based on the feedback information, for retransmitting the packet.

In a further implementation form of the first aspect, the transmitting device is further configured to share the feedback information and/or a feedback resource with at least one other transmitting device.

The transmitting device may share one or more feedback resources with at least one other transmitting device. In this way, the overall reliability and coverage in the network are improved.

A second aspect of the present disclosure provides a receiving device for wireless communications, the receiving device being configured to receive a packet in more than one transmission from a transmitting device, and combine the transmissions and/or decode at least one transmission to obtain the packet.

The receiving device may particularly decode a single transmission, in order to attempt to obtain the packet. If it does not succeed, it may decode multiple transmissions and combine them to obtain the packet. In other words, the receiving device of the second aspect may be able to decode at least one transmission to obtain the packet.

Since the receiving device of the second aspect is able to combine the multiple transmissions of the same packet, in order to obtain the packet, the reliability of obtaining the correct packet is significantly improved. Furthermore, since each of the multiple transmissions may be a transmission beam, the receiving device is compatible with beamforming.

In an implementation form of the second aspect, each transmission is allocated a resource set, and a resource set includes at least one time resource, frequency resources code resource and/or spatial resource.

As mentioned above for the transmitting device of the first aspect, e.g. a number of beam transmissions can be received in different slots.

In a further implementation form of the second aspect, the receiving device is further configured to send feedback information for the packet to the transmitting device or to another receiving device in a determined resource, particularly HARQ feedback information including ACK and/or NACK.

In particular, the receiving device may send to the transmitting device only ACK, only NACK, or both. For the case of ACK and NACK, different resources may be allocated to these feedbacks. Further, the receiving device may send to another receiving device only ACK, only NACK, or ACK and NACK. For the case of ACK and NACK either the same resource, e.g. a receiving device specific feedback resource, or different resources may be allocated, e.g. a common feedback resource. Accordingly, the receiving device is configured to implement a feedback mechanism, which significantly improves the reliability and efficiency of the wireless communication with the transmitting device.

In a further implementation form of the second aspect, the feedback information includes ACK and NACK, and ACK and NACK are allocated to different resources.

In a further implementation form of the second aspect, the feedback information further includes at least one of: an ID of the receiving device or an ID of a group of receiving devices the receiving device belongs to, QCL reference information.

In a further implementation form of the second aspect, the QCL reference information may correspond to the QCL assumption of one or more than one transmission from the transmitting device to the receiving device.

In a further implementation form of the second aspect, the receiving device is further configured to send the feedback information in more than one transmission.

This improves the reliability of the feedback mechanism.

In a further implementation form of the second aspect, the receiving device is configured to send the feedback information on a channel and/or resource shared with other receiving devices to the transmitting device.

This reduces the overhead of the feedback mechanism.

In a further implementation form of the second aspect, the receiving device is further configured to receive feedback information from at least one other receiving device, and aggregate and/or concatenate feedback information received from a first other receiving device with own feedback information and/or with feedback information received from a second other receiving device, and send the aggregated and/or concatenated feedback information to the transmitting device or other receiving device.

This allows for an efficient and at the same time low overhead feedback mechanism.

In a further implementation form of the second aspect, the receiving device is further configured to receive feedback information including NACK or ACK and/or a corresponding index from at least one other receiving device, and aggregate and/or concatenate the NACK or ACK and/or the corresponding index and send the aggregated and/or concatenated feedback information to the transmitting device or other receiving device.

This allows for an efficient and at the same time low overhead feedback mechanism.

In a further implementation form of the second aspect, the receiving device is further configured to receive a signaling that indicates whether to send the aggregated and/or concatenated feedback information to the transmitting device or other receiving device.

In a further implementation form of the second aspect, the receiving device is further configured to receive a signaling that indicates whether to make retransmission based on the feedback information it received and/or excluding the feedback that it send the corresponding retransmitted packet and/or including the feedback without retransmitting the corresponding packet.

This improves the efficiency of the feedback mechanism.

In a further implementation form of the second aspect, the receiving device is further configured to send the feedback information according to a reference timing, wherein the reference timing includes at least one of: a predefined time resource, a first time resource that is allocated to the more than one transmission, a time resource wherein the transmitted channel and/or signal of the time resource is quasi co-located with a channel and/or a signal identified during initial access and/or after initial access, and/or a time resource allocated to the last received transmission of the more than one transmission.

Note that a channel and/or a signal identified during initial access and/or after initial access can comprise at least one of synchronization signal, Physical Broadcast CHannel (PBCH), Synchronization Signal and PBCH Block (SSB), Channel State Information Reference Signal (CSI-RS), Tracking Reference Signal (TRS), Positioning Reference Signal (PRS), Demodulation Reference Signal (DMRS).

This further improve the efficiency of the feedback mechanism.

In a further implementation form of the second aspect, the feedback information includes ACK or NACK or includes ACK and NACK, and the determined resource is a common preamble sequence, and/or a common Physical Uplink Control Channel (PUCCH) resource, and/or a common Physical Uplink Shared Channel (PUSCH) resource for the receiving device and at least one other receiving device.

The common preamble sequence may be a shared preamble sequence. This improves the efficiency and reduces the overhead of the feedback mechanism.

In a further implementation form of the second aspect, when the feedback information includes ACK and NACK, the receiving device is configured to transmit the feedback information in different common preamble sequences, and/or different common PUCCH resources, and/or different common PUSCH resources.

The term "common" can also be substituted by "shared".

A third aspect of the present disclosure provides a transmitting method, in particular for wireless communications, the transmitting method comprising: determining more than one transmission for transmitting a packet, and transmitting the packet using the determined transmissions.

In an implementation form of the third aspect, each transmission is allocated a resource set, and a resource set includes at least one time resource, frequency resource, code resource, and/or spatial resource.

In a further implementation form of the third aspect, the method further comprises determining a number of transmissions, in particular determine the number of transmissions depending on whether the packet is initially transmitted or retransmitted to the receiving device and/or group of receiving devices.

In a further implementation form of the third aspect, the packet is a transmission block, particularly from a Media Access Control (MAC) layer, and/or a code block.

In a further implementation form of the third aspect, the method further comprises signaling information to the receiving device and/or group of receiving devices, wherein the information includes at least one of: a QCL assumption and/or a spatial relationship, a number of transmissions, a periodicity of the transmissions.

In further implementation form of the third aspect, the method further comprises signaling information to the receiving device and/or group of receiving devices, wherein the information includes at least one of: an indication whether QCL assumptions and/or spatial relationship are enabled, an indication whether QCL assumptions are the same for antenna ports associated with different determined transmission, QCL assumptions, and/or QCL parameter, and/or QCL type for the determined transmission.

In a further implementation form of the third aspect, the method further comprises signaling information to the receiving device and/or group of receiving devices, wherein the information includes at least one of: a resource set for more than one transmission, a resource set for a control channel of more than one transmission.

In a further implementation form of the third aspect, the method further comprises signaling information to the receiving device and/or group of receiving devices, wherein the information includes at least one of: an ID or index range of the determined transmissions; an ID of the receiving device and/or group of receiving devices.

In a further implementation form of the third aspect, the method further comprises signaling information to the receiving device and/or group of receiving devices, wherein the information includes at least one of: an indication whether a Hybrid Automatic Repeat Request, HARQ, process is enabled for the determined transmissions; a HARQ process number and/or maximum HARQ process number for the determined transmissions.

In a further implementation form of the third aspect, the method further comprises signaling one or more than one resource set to the receiving device and/or group of receiving devices, wherein the resource set includes at least one of: time resource, frequency resource, code resource, and/or spatial resource.

In a further implementation form of the third aspect, the method further comprises signaling information to the receiving device and/or group of receiving devices, wherein the information includes at least one of: resource set for more than one transmission, resource set for control channel of more than one transmission.

In a further implementation form of the third aspect, the method further comprises receiving feedback information, particularly HARQ feedback information including NACK and/or ACK, from the receiving device and/or group of receiving devices, respectively, in a determined resource, and determining a retransmission of the packet and/or a number of transmissions for retransmission of the packet based on the feedback information.

In a further implementation form of the third aspect, the method further comprises sharing the feedback information and/or a feedback resource with at least one other transmitting device.

The method of the third aspect and its implementation forms achieve the same advantages and effects as the device of the first aspect and its respective implementation forms.

A fourth aspect of the present disclosure provides a receiving method, in particular for wireless communications, the receiving method comprising: receiving a packet in more than one transmission, and combining the transmissions and/or decode at least one transmission to obtain the packet.

In an implementation form of the fourth aspect, each transmission is allocated a resource set, and a resource set includes at least one time resource, frequency resources code resource and/or spatial resource.

In a further implementation form of the fourth aspect, the method further comprises sending feedback information for the packet to a transmitting device or to another receiving device in a determined resource, particularly HARQ feedback information including ACK and/or NACK with ACK and NACK.

In a further implementation form of the fourth aspect, the feedback information includes ACK and NACK, and ACK and NACK are allocated to different resources.

In a further implementation form of the fourth aspect, the feedback information further includes at least one of: an ID of the receiving device or an ID of a group of receiving devices the receiving device belongs to, QCL reference information.

In a further implementation form of the fourth aspect, the method further comprises sending the feedback information in more than one transmission.

In a further implementation form of the fourth aspect, the method further comprises sending the feedback information on a channel and/or resource shared with other receiving devices to the transmitting device.

In a further implementation form of the fourth aspect, the method further comprises receiving feedback information from at least one other receiving device, and aggregating and/or concatenating feedback information received from a first receiving device with second feedback information and/or feedback received from a third receiving device, and sending the aggregated and/or concatenated feedback information to the transmitting device or other receiving device.

In a further implementation form of the fourth aspect, the method further comprises receiving feedback information including NACK or ACK and/or a corresponding index from at least one other receiving device, and aggregating and/or concatenating the NACK or ACK and/or the corresponding index and sending the aggregated and/or concatenated feedback information to the transmitting device or other receiving device.

In a further implementation form of the fourth aspect, the method further comprises receiving a signaling that indicates whether to send the aggregated and/or concatenated feedback information to the transmitting device or other receiving device.

In a further implementation form of the fourth aspect, the method further comprises sending the feedback information according to a reference timing, wherein the reference timing includes at least one of: a predefined time resource, a first time resource that is allocated to the more than one transmission, a time resource wherein the transmitted channel and/or signal of the time resource is quasi co-located with a channel and/or a signal identified during initial access and/or after initial access, and/or a time resource allocated to the last received transmission of the more than one transmission.

In a further implementation form of the fourth aspect, the feedback information includes ACK or NACK or includes ACK and NACK, and the determined resource is a common preamble sequence, a common Physical Uplink Control Channel (PUCCH) resource, or a common Physical Uplink Shared Channel (PUSCH) resource for the receiving device and at least one other receiving device.

In a further implementation form of the fourth aspect, when the feedback information includes ACK and NACK, the method further comprises transmitting the feedback information in different common preamble sequences, different common PUCCH resources, or different common PUSCH resources.

The method of the fourth aspect and its implementation forms achieve all advantages and effects of the receiving device of the second aspect and its respective implementation forms.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the present disclosure will be explained in the following description of specific embodiments in relation to the enclosed drawings, in which.

DETAILED DESCRIPTION OF EMBODIMENTS

Figure 1:
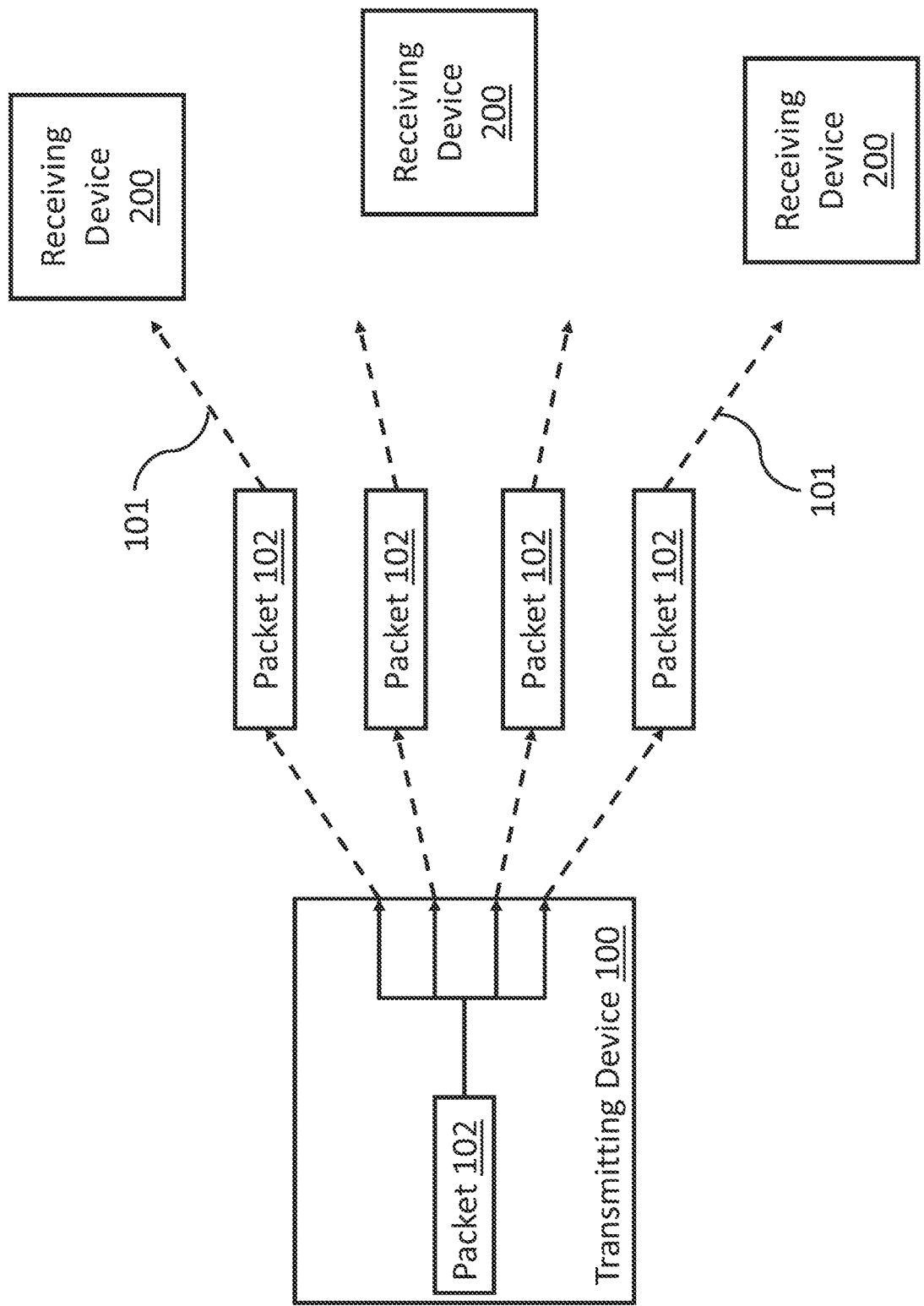
FIG. 1 shows a transmitting device according to an embodiment.

FIG. 1 shows a transmitting device 100 according to an embodiment. The transmitting device 100 is in particular configured for wireless communications, specifically it may be for V2X communications or C-ITS communications. The transmitting device 100 may be (or may be implemented in) a BS or another network access node or UE, which is configured to communicate wirelessly with one or more receiving devices 200, for instance, one or more UEs that may specifically be located in one or more vehicles.

The transmitting device 100 is configured to determine more than one transmission 101 for transmitting a packet 102. To this end, the transmitting device 100 may comprise a processor to carry out the determination of the transmissions 101. The transmitting device 100 is further configured to transmit the packet 102 to a receiving device 200 (as e.g. shown in FIG. 2) and/or to a group of receiving devices 200 by using the determined transmissions 101. To this end, the transmitting device 100 may comprise a transmitter and/or one or more antennas for transmitting the packet 102 wirelessly. In other words, the transmitting device 100 may bundle multiple transmissions 101 for sending the packet 102 to the receiving device(s) 200.

The packet 102 may specifically be a transmission block, for instance from a MAC layer and/or a code block (CB). Further, each transmission 101 of the transmitting device 100 may specifically be allocated a certain (different) resource set. Thereby, a resource set may include at least one time resource, frequency resource, code resource, and/or spatial resource.

Figure 2:
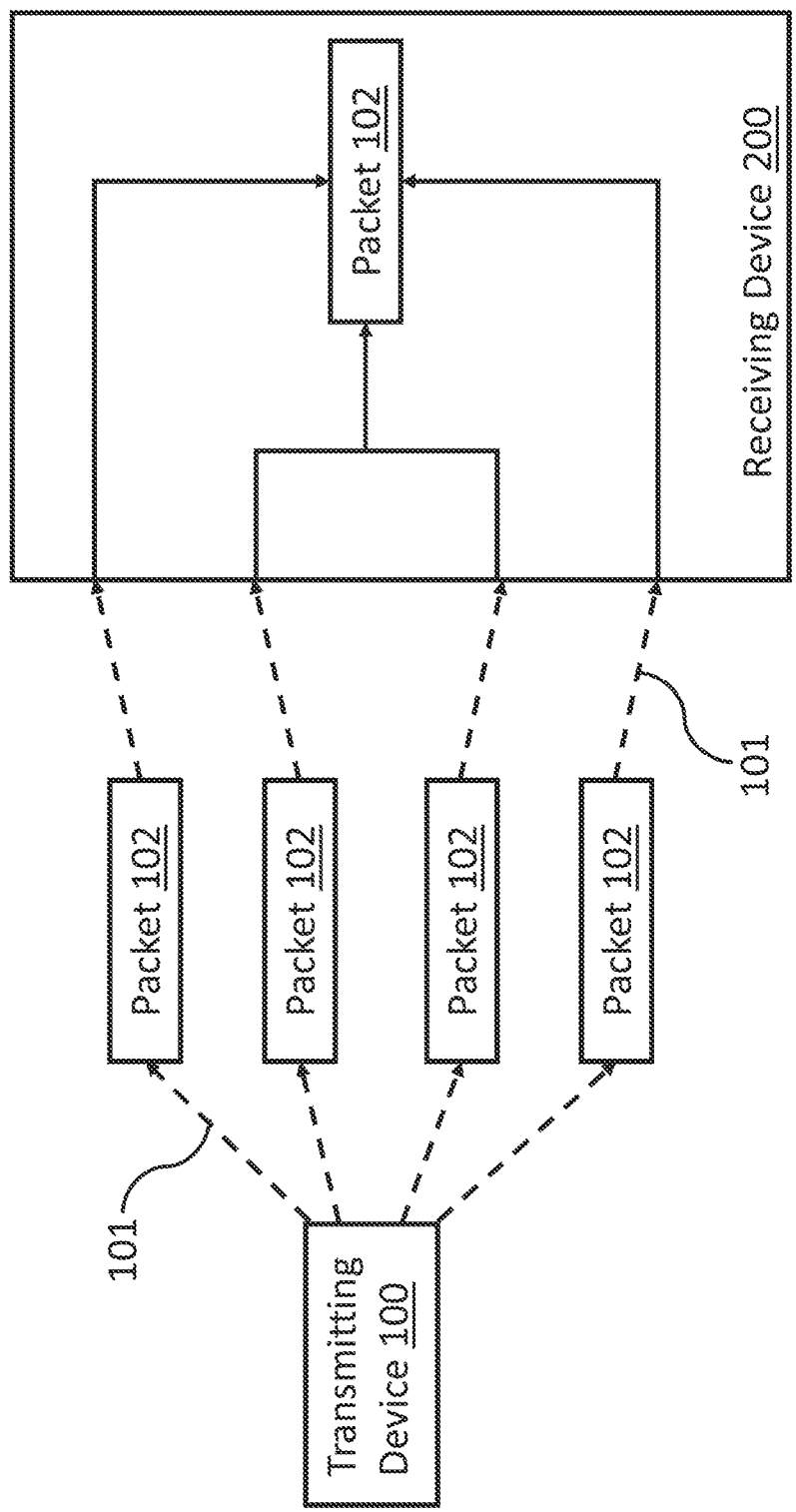
FIG. 2 shows a receiving device according to an embodiment.

FIG. 2 shows a receiving device 200 according to an embodiment. The receiving device 200 is configured for wireless communications, in particular it may be for V2X communications. The receiving device 200 may, for instance, be or be included in a UE, which may specifically be located in a vehicle.

The receiving device 200 is configured to receive a packet 102 in more than one transmission 101 from a transmitting device 100, which may be the transmitting device 100 shown in FIG. 1. To this end, the receiving device 200 may include a receiver and/or one or more antennas and/or one or more beams to receive the packet 102 wirelessly. Again, each transmission 101 may be allocated a resource set, including e.g. at least one time resource, frequency resources code resource and/or spatial resource. Further, the receiving device 200 is configured to combine the transmissions and/or decode at least one transmission and/or receive the bundled transmissions 101 to obtain the packet 102. To this end, the receiving device 200 may comprise a processor for carrying out the combining, for instance, by decoding each transmission 101 and combining the decoding results.

In the following, details of the present disclosure are now described with respect to the transmitting device 100 shown in FIG. 1 and the receiving device 200 shown in FIG. 2, respectively.

At first, details of data transmissions and associated control transmissions are described, specifically considering beamforming and multiple beam combining and/or multiple beam transmissions, in order to enhance the coverage/reliability. For V2X communications, the reliability and/or coverage of specifically the Uu link (i.e. the link between the receiving device 200 and the transmitting device 100) and/or the sidelink (i.e. between two receiving devices 200 and/or the link between the receiving device 200 and the transmitting device 100) or both, or unicast or broadcast or multicast or groupcast, can be significantly enhanced with using more than one transmission 101 for the same packet 102—as described above. That is, the more than one transmissions 101 are sent from the transmitting device 100 and are received by and combined in the receiving device 200 to obtain the packet 102.

Figure 3:
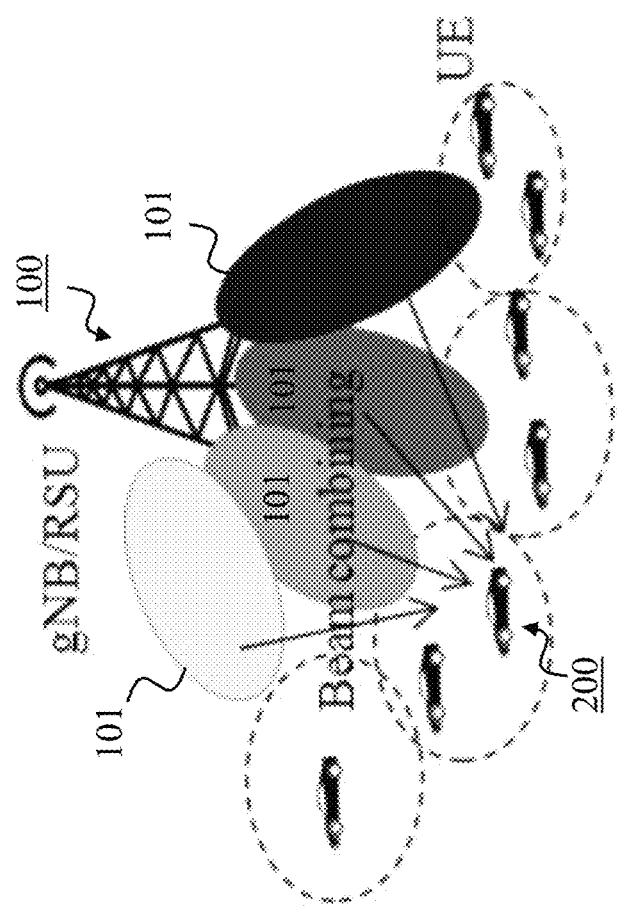
FIG. 3 shows multiple beam transmissions between a transmitting device (gNB/RSU/UE) according to an embodiment and a receiving device (UE) according to an embodiment.

FIG. 3 shows an example, in which the same packet 102 is transmitted in multiple transmissions 101—here specifically beam transmissions 101—from a transmitting device 100 (which is here a gNB or Remote Switching Unit (RSU) and/or a UE e.g. located in a leading vehicle) to a receiving device 200 (which is here a UE located in a vehicle) or to a group of receiving devices 200 (multiple UEs). Especially for the groupcast or multicast or broadcast scenario, the multiple beam transmissions 101 can be received by one receiving device 200 or by each receiving device 200 in one group, and the combining of the transmissions 101 can be conducted accordingly. Thus, the received power or signal-to-noise and interference ratio in the receiving device 200 will be improved. As a consequence, the coverage and reliability are enhanced.

Figure 3A:
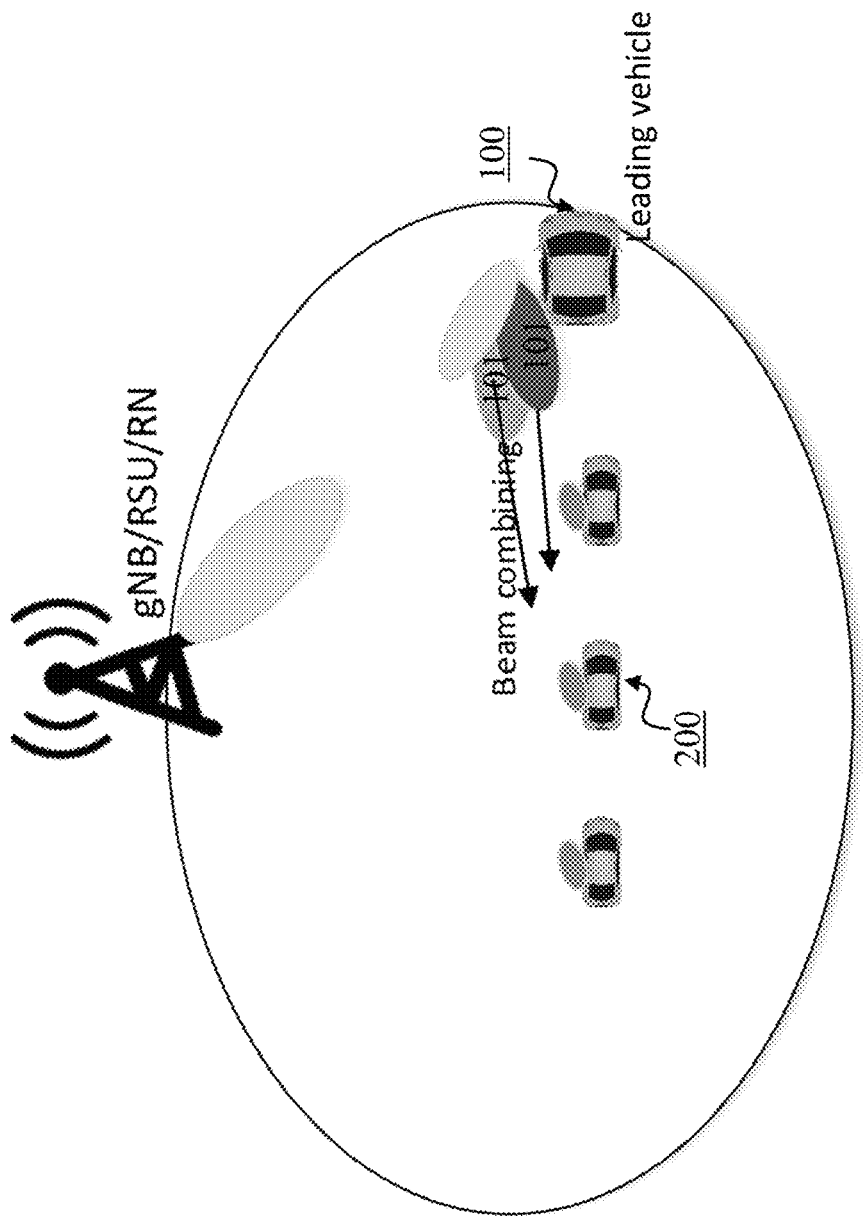
FIG. 3A shows multiple beam transmissions between a transmitting device (UE) according to an embodiment and a receiving device (UE) according to an embodiment.

FIG. 3A shows an example, in which the same packet 102 is transmitted in multiple transmissions 101—here specifically beam transmissions 101—from a transmitting device 100 (which is here a UE e.g. located in a leading vehicle) to a receiving device 200 (which is here a UE located in a vehicle) or to a group of receiving devices 200 (multiple UEs). Especially for the groupcast or multicast or broadcast scenario, the multiple beam transmissions 101 can be received by one receiving device 200 or by each receiving device 200 in one group, and the combining of the transmissions 101 can be conducted accordingly. Thus, the received power or signal-to-noise and interference ratio in the receiving device 200 will be improved. As a consequence, the coverage and reliability are enhanced. Note RN means relay node in the figure.

Figure 4:
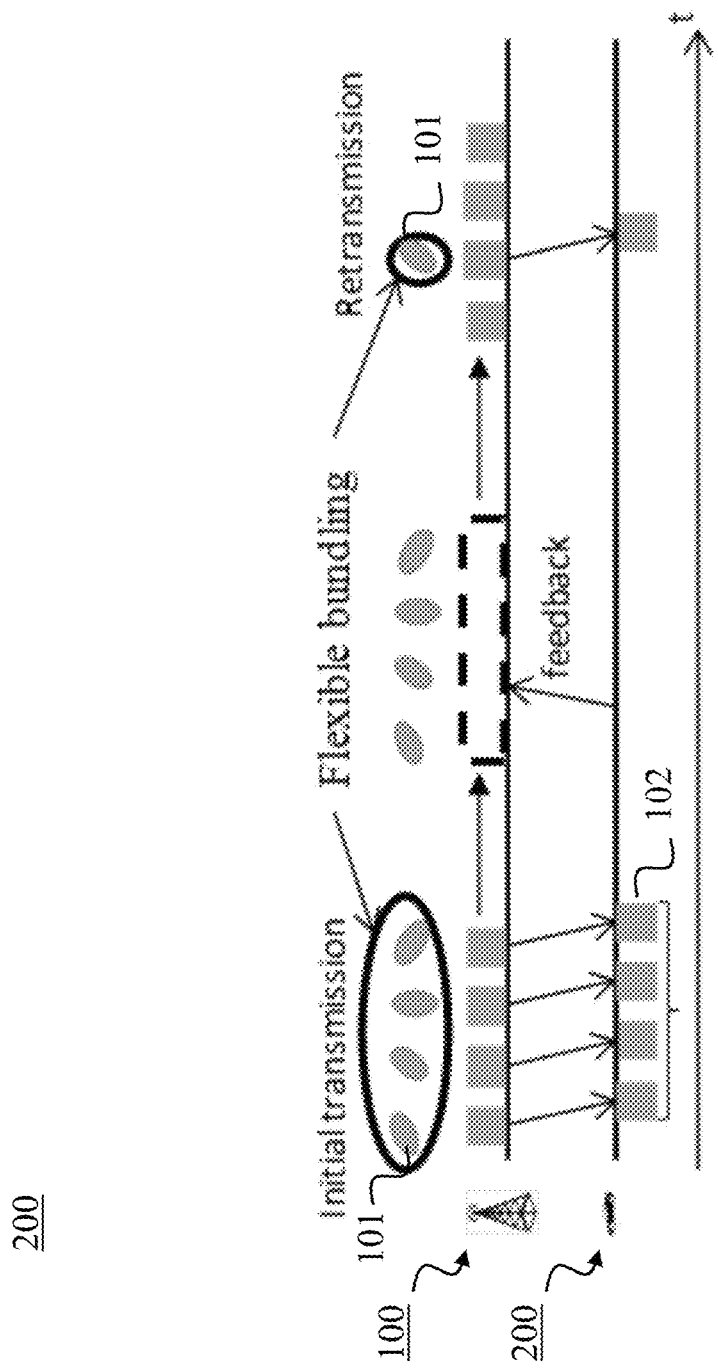
FIG. 4 shows an example of flexible bundling of (multiple) transmissions depending on whether a packet is initially transmitted or retransmitted.

FIG. 4 shows that the number of the multiple (bundled) transmissions 101 that are sent from the transmitting device 100 to the receiving device 200 or group of receiving devices 200, may be flexibly configured at the transmitting device 100. For example, as shown in FIG. 4, for initially transmitting a packet 102 and for retransmitting a packet 102, respectively, different numbers of transmissions 101 may be used. This may also depend on the configuration of the device 100. In the shown example, four different transmissions 101 are used for initially transmitting the packet 102, while only one transmission 101 is used for retransmitting the same packet 102. Notably, retransmitting the packet 102 can be triggered by a feedback from the receiving device 200 to the transmitting device 100. A suitable feedback mechanism is described further below. The scheme of FIG. 4 may specifically be referred to as "flexible bundling" of multiple transmissions 101, for example, of beam transmissions 101.

From a standard perspective, e.g. new radio (NR), there are two types of physical layer (PHY) transmissions, namely, physical channel and physical signal. Physical channel corresponds to a set of resource elements carrying information originating from higher layers e.g. Physical Downlink Control Channel (PDCCH), Physical Downlink Share Channel (PDSCH), Physical Broadcast Channel (PBCH), Physical Uplink Shared Channel (PUSCH), Physical Uplink Control Channel (PUCCH), Physical Random Access Channel (PRACH) etc. Physical signal corresponds to a set of resource elements used by the physical layer, but not carry information originating from higher layers e.g. Demodulation Reference Signal (DMRS), Channel State Information Reference Signal (CSIRS), Phase Tracking Reference Signal (PT-RS), Sounding Reference Signal (SRS) etc.

Most of the channels and signals are transmitted by a corresponding antenna port. Antenna ports are defined for both Downlink (DL) and Uplink (UL) e.g. DMRS of PDSCH, DMRS of PDCCH, CSIRS, PT-RS for PDSCH, Synchronization Signal (SS)/PBCH block, DMRS of PUSCH, PT-RS for PUSCH, DMRS of PUCCH, PRACH, SRS etc.

Without loss of generality, when another link is introduced e.g. a sidelink between the receiving device 200 and another receiving device 200, the corresponding data channels can be extended e.g. to Physical Sidelink Shared Channel, Physical Sidelink Control Channel, Physical Sidelink Broadcast Channel, Physical Sidelink Discovery Channel, Sidelink DMRS, Sidelink SS etc.

The multiple transmission 101 sent from the transmitting device 100 to the receiving device 200 can be represented by different QCL assumptions at the receiving side (i.e. from the perspective of the receiving device 200) and/or by different spatial relationship at the transmitting side (i.e. from the perspective of the transmitting device 100).

A QCL assumption is defined in NR as follows: Two antenna ports are said to be quasi co-located, if the large-scale properties of the channel, over which a symbol on one antenna port is conveyed, can be inferred from the channel, over which a symbol on the other antenna port is conveyed. The large-scale properties include one or more of: Delay spread, Doppler spread, Doppler shift, average gain, average delay, and spatial Rx parameters. Notably, in some cases an antenna port may not be mentioned in the description of quasi co-location assumption. For example, the receiving device 200 (UE) may assume PDSCH DMRS and SS/PBCH blocks to be quasi co-located with respect to Doppler shift, Doppler spread, average delay, delay spread, and spatial Rx. The transmitting devices 100 mentioned can be gNB, BS, relay, RSU, UE, vehicle etc.

Further, there may be different QCL assumptions between two antenna ports from the side of the receiving device 200, namely: type A (Doppler shift, Doppler spread, average delay, delay spread); type B: (Doppler shift, Doppler spread); type C (average delay, Doppler shift); type D (spatial Rx). Usually type D QCL assumption means the receiver at the receiving device 200 assumes the same Rx beam between two antenna ports or two transmissions 101.

For the multiple transmissions 101 sent at the transmitting device 100, a spatial relationship can be defined between two antenna ports. Usually a spatial relationship is used between one Tx antenna port e.g. PUCCH or SRS and the reference RS antenna port e.g. SSB (SS/PBCH block) or CSIRS or SRS. In other word, such kind of spatial relationship means the transmitting device 100 assumes: same Tx beam or same Tx beam as Rx beam between two antenna ports.

In an example of the above, a receiving device 200 (also referred to as "UE A"), which receives more than one transmission 101 of one packet 102 from a transmitting device 100 is considered, i.e. the transmitting device 100 (also referred to as "node A") transmits more than one transmission 101 of one packet 102. This packet 102 can be a transmission block (TB) from a MAC layer or a code block (CB). The associated RS antenna ports of the more than one transmission 101 may have their respective QCL assumptions with respect to SSB or DMRS of PBCH or CSIRS or TRS or PT-RS. The associated RS antenna ports may include the antenna port of DMRS of PDSCH and/or antenna port of DMRS of PDCCH.

The more than one transmission 101 can be more than one transmission in a time domain, frequency domain, code domain, space domain or a combination of part or all of them. Each transmission unit (i.e. time domain or frequency domain or code domain or space domain or any combination of them) in the bundling or repetition of the transmission 101 of the packet 102 can be called bundling unit or repetition unit. Without loss of generality the term "bundling" will be used in the following.

The more than one transmission 101 of the packet 102 in the time domain can be called slot bundling, mini-slot bundling, Transmission Time Interval (TTI) bundling, sub-slot bundling, or short TTI bundling. In the frequency domain, the more than one transmission 101 can be in one or more than one of: bandwidth part, resource block, resource block group, component carrier. In the code domain, the more than one transmission 101 can be in different sequences. In the space domain, the more than one transmission 101 can be in different beams or equivalently have different QCL assumptions. When multiple beams are transmitted in different time units, this can also be called multi-beam time unit bundling, multi-beam slot bundling, multi-beam mini-slot bundling, multi-beam TTI bundling, multi-beam sub-slot bundling, or multi-beam short TTI bundling.

For a physical channel transmission, one embodiment may specifically be a PDCCH scheduled PDSCH. There can be one PDCCH scheduling more than one PDSCH transmissions or each PDCCH schedules one PDSCH transmission. The more than one transmission 101 can be for PDSCH or both PDCCH and PDSCH.

Figure 5:
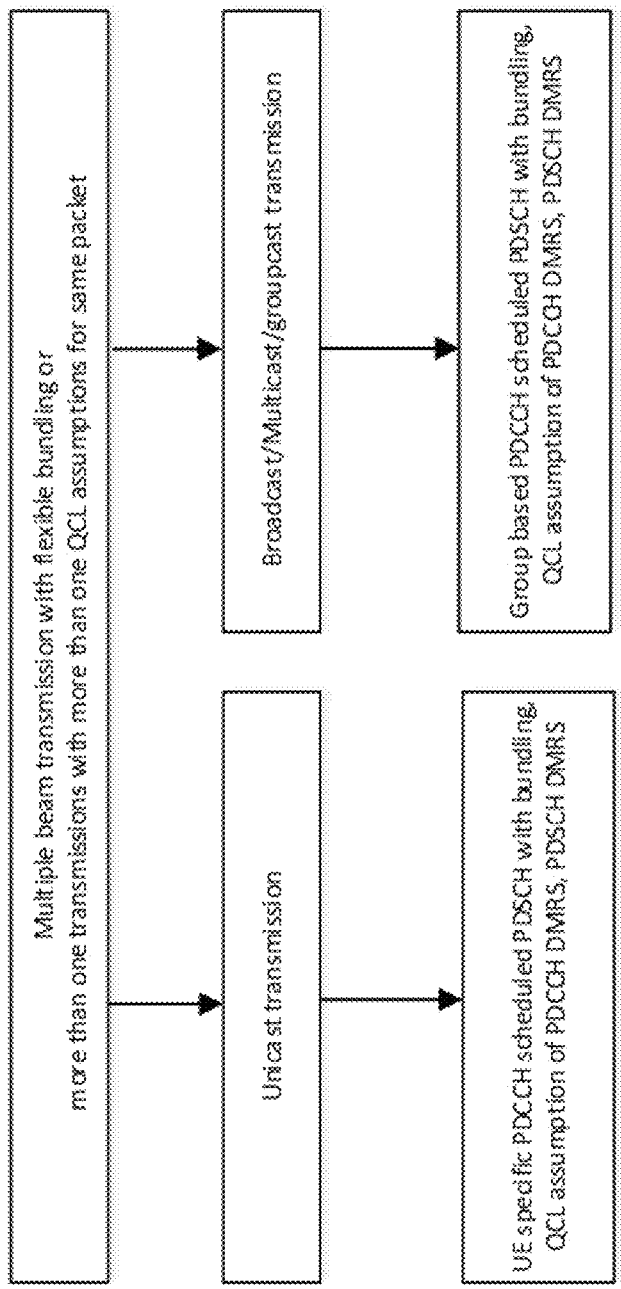
FIG. 5 shows an overview of using more than one transmission with more than one QCL assumption for the same packet for unicast, broadcast, multicast or groupcast by a transmitting device according to an embodiment.

FIG. 5 shows an overview, according to which more than one transmission 101 with more than one QCL assumptions for the same packet 102 can be used for at least one of unicast, broadcast, multicast, and/or groupcast transmission. Further, the more than one transmission 101 with more than one QCL assumptions for the same packet 102 can be signaled to the receiving device 200, or can be predefined for the receiving device 200.

Signaling may be received by the receiving device 200 specifically on the configuration of the more than one transmission 101 for the same packet 102. The signaling information may include one or more of: ON or OFF of more than one transmission 101 of the same packet 102, the number of the transmissions 101, a periodicity of the bundling transmissions 101, Enable or Disable of QCL assumptions of the more than one transmission 101, same or respective QCL assumptions for the DMRS antenna port of more than one PDCCH, same or respective QCL assumptions for the DMRS antenna port of more than one PDSCH, identification of the more than one transmission 101, index of each of the more than one transmission 101, identity of the receiving device 200, identity of a group of the receiving device 200, a HARQ process, and a redundancy version (the same HARQ process can be configured for the more than one transmission 101 for the same packet 102).

When the QCL assumptions for the DMRS antenna port of more than one PDCCH is explicitly signaled to the receiving device 200, each DMRS antenna port of one PDCCH corresponding to one reference signal/channel e.g. SSB or RS for the QCL assumption. They can be separately indicated or jointly indicated. The separate indication can be in a different information element (IE) in the Radio Resource Control (RRC) signaling or MAC Control Element (CE), and the joint indication can be in the same IE in the RRC signaling or MAC CE. Notably, more than one SSB or RS or both may be measured and reported to reflect the respective received strength. Alternatively the strength of more than one SSB or RS or both or a DL channel condition may be reflected by PRACH or SRS from the receiving device 200.

Alternatively, if no independent QCL assumption indication or just one QCL assumption indication of DMRS of more than one PDCCH or PDSCH is signaled, the DMRS antenna port of more than one PDCCH or PDSCH transmission may be assumed to have the same QCL assumption.

Further details on the signaling design to the receiving device 200, specifically of PDCCH and or PDSCH beamforming and QCL assumption, are now described.

In particular, in a first exemplary embodiment, with broadcast/multicast/groupcast PDCCH and/or PDSCH beamforming and QCL assumption, further details of the signaling can specific to the receiving device 200 ("UE specific signaling") and group specific signaling or group specific signaling:

1. UE specific signaling or group specific higher layer signaling (RRC signaling, MAC CE signaling or combination of them) may indicate one or more than one of the following:

Bundling or not (i.e. multiple transmissions 101 for a packet 102 or not).
Bundling size (i.e. the number of transmissions 101 for a packet 102).
Bundling size set $\{1, 2, \ldots, M\}$.
The resource for the more than one transmission 101, which may include one or more than one of:
The resource set for a control channel.
Case1: The same control resource set (CORESET) configuration for more than one transmission 101.

Case2: Different CORESET configurations for the more than one transmissions 101. E.g. frequency offset between or among different CORESETs are configured
  A time unit or time duration is indicated, or consecutive time units are configured. The time units or duration can be downlink or uplink or side link or flexible.
The periodicity of transmissions e.g. including
  One or more than one periodicity of the bundling transmissions 101.
The resource set for the more than one transmission 101 e.g. including:
  The (time) slots or time units for bundling, e.g. beam slots.
Predefined consecutive DL/UL slots used for bundling.
PDCCH DMRS QCL assumption (or predefine it) e.g.:
  According to selected SSB for initial access of each receiving device 200 (UE) or the CRI or SSB each UE report or the more than one SSB or CRI configured by the transmitting device 100 (gNB or RSU or UE).
  Alternatively, whether DMRS of PDSCH has same QCL assumption with DMRS of PDCCH.
A bundling/group information including one or more than one of:
  An identification range (max value can be the beam number)—(1, 2 . . . K).
  DMRS scrambling identity (ID) for a control channel e.g. group PDCCH or a group data channel.
  CRC scrambling ID for a control channel e.g. group PDCCH or group data channel.
  A bundling/Group ID or index.
2. A group specific Downlink Control Information (DCI) may indicate one or more than one of the following for PDSCH:
  A "No bundling" or "bundling size" indication from the higher layer configured set.
    0 Bit for bundling in DCI, when bundling is not configured via higher layer signaling.
  A bundling identification indication from the higher layer configured set.
  A scrambling ID of PDSCH DMRS.
  MCS.
  A Redundancy version.
  A HARQ process number.
Notably, when a bundling identification is configured, a receiving device 200 only combines PDSCH with the same bundling identification.

Several alternative examples are given below for PDCCH DMRS QCL assumption in the bundling:
Alternative 1: Each receiving device 200 assumes QCL assumption of DMRS of PDCCH with the configured QCL set in order.
  one bundling size {3}; {SSB 1,SSB 2,SSB 3} or {CRI 1,CRI 2,CRI 3}:
  Receiving device 200 in each group or each transmission 101 (beam) has the assumption: DMRS of PDCCH1_1 assumes QCL with SSB 1, DMRS of PDCCH1_2 assume QCL with SSB 2, DMRS of PDCCH1_3 assume QCL with SSB 3.
Alternative 2: Each receiving device 200 assumes 1$^{st}$ PDCCH(DMRS) in the bundling has QCL with the selected SSB for initial access or previously configured CRI, 2$^{nd}$ PDCCH follows in the configured set, until to the bundling size.

Example: more than one bundling size: bundling size set {1,2}; QCL reference set {SSB1,2}, {SSB2,3}, {SSB3} or {CRI1,CRI2}, {CRI2,CRI3}, {CRI3}:
  Receiving device 200 finds its own QCL reference set according to its SSB selected for initial access or previously configured CRI. And its SSB is the first one in the QCL reference set.
  For receiving device 200 group 1 in transmission beam 1: DMRS of PDCCH1_1 assumes QCL with SSB 1, DMRS of PDCCH1_2 assume QCL with SSB 2, bundling size 2.
  For receiving device 200 group 2 in transmission beam 2: DMRS of PDCCH2_1 assume QCL with SSB 2, DMRS of PDCCH 2_2 assume QCL with SSB 3, bundling size 2;
  For receiving device 200 in transmission beam 3: DMRS of PDCCH3_1 assume QCL with SSB 3, bundling size 1.
Alternative 3: Each receiving device 200 assumes 1st PDCCH(DMRS) in the bundling has QCL with the selected SSB for initial access or previously configured CRI. If no, its SSB or CRI in the first position in the QCL set, assume the QCL set including the selected SSB for initial access or previously configured CRI
  Example: one bundling size {2}; {SSB1,SSB2}, {SSB2, SSB3}:
  For receiving device 200 group 1 in transmission beam 1: DMRS of PDCCH1_1 assume QCL with SSB 1, DMRS of PDCCH1_2 assume QCL with SSB 2;
  For receiving device 200 group 2 in transmission beam 2: DMRS of PDCCH2_1 assume QCL with SSB 2, DMRS of PDCCH 2_2 assume QCL with SSB 3;
  For receiving device 200 group 3 in transmission beam 3: DMRS of PDCCH3_1 assume QCL with SSB 2, DMRS of PDCCH3_2 assume QCL with SSB 3.
Alternative 4: Each receiving device 200 assumes QCL assumption of DMRS of PDCCH with the configured QCL set and the bundling identification (BD) in order. Different bundling identification (BD) in high layer signaling or DCI can be used to separate different bundling group. And the groupcast transmission BD can be configured with UE specific signaling.
  Example: bundling size {2,3}; {SSB1,2,3}, {SSB4,5}:
  The beam slot transmission for beam 1, 2, 3 are bundled with one BD; the beam slot transmission for beam 4 and 5 are bundled with another BD. For initial access: receiving device 200 group 1 to 5 or transmission beam 1 to 5 correspond to —SSB1 to 5 respectively. Equivalently, receiving devices 200 in group 1 to 5 or transmission beams 1 to 5 are configured with CRI1~CRI5 respectively.
  For receiving device 200 group 1 in transmission beam 1: DMRS of PDCCH1_1 assume QCL with SSB 1, DMRS of PDCCH1_2 assume QCL w. SSB 2, DMRS of PDCCH1_3 assume QCL w. SSB 3
  For receiving device 200 group 2 in transmission beam 2: DMRS of PDCCH2_1 assume QCL w. SSB 1, DMRS of PDCCH 2_2 assume QCL w. SSB 2, DMRS of PDCCH2_3 assume QCL w. SSB 3
  For receiving device 200 group 3 in transmission beam 3: PDCCH3_1 QCLed w. SSB 1, PDCCH3_2 QCLed w. SSB 2, PDCCH3_3 QCLed w. SSB 3
  For receiving device 200 group 4 in transmission beam4: PDCCH4_1 QCLed w. SSB 4, PDCCH4_2 QCLed w. SSB 5

For receiving device 200 group 5 in transmission beam 5: PDCCH5_1 QCLed w. SSB 4, PDCCH5_2 QCLed w. SSB 5

In an exemplary second embodiment, on unicast PDCCH and PDSCH beamforming and QCL assumption, further detail of the signaling can be UE specific higher layer signaling or UE specific DCI or a combination of high layer signaling and DCI:

1. UE specific higher layer signaling may indicate one or more than one of the following:
   Bundling or not.
   The bundling size.
   The bundling size set e.g. {1, 2, . . . , M}.
   The resource for the more than one transmission 101, which may include one or more than one of:
      The resource set for control channel
         E.g. the CORESET for a control channel of more than one transmission 101. The CORESETs can be configured or consecutive time units configured. Frequency offset between or among different CORESETs can be configured
      The periodicity of transmissions e.g. including
         One or more than one periodicity of the bundling transmissions 101.
      The resource set for the more than one transmission 101 e.g. including:
         The (time) slots or time units for bundling, e.g. beam slots.
            E.g. the configured slots or time units or the configured consecutive slots or time units for bundling
      Predefine consecutive DL/UL slots used for bundling.
   Max HARQ process number for the bundling
   QCL signaling on PDCCH for the bundling slot
      QCL set for PDCCH {SSB index 1, . . . , SSB index N} or {CRI1, . . . , CRIN}, N>=1
         $1^{st}$ PDCCH quasi co-located (QCLed) with the SSB associated with preamble e.g. SSB index 1
      Or PDSCH has same QCL assumption with PDCCH or not 2. A UE specific DCI may indicate one or more than one of the following for PDSCH:
   A bundling size e.g.
      An indication from the set configured by higher layer signaling
      0 Bit for bundling in DCI when bundling is not configured via higher layer signaling
   The Bundling slot.
   The QCL assumption for the PDSCH DMRS in the bundling transmission
   The Scrambling ID of PDSCH DMRS
   The HARQ process number.
   MCS
   QCL assumptions for more than one PDSCH DMRS in the bundling transmission 101.
   The scrambling ID for more than one PDSCH DMRS in the bundling transmission 101.
   The redundancy version for more than one PDSCH in the bundling transmission 101.
   MCS for more than one PDSCH in the bundling transmission 101.

Notably, for the above two exemplary embodiments, for bundling transmission PDSCH indication, there can be two cases. One is a separate PDCCH or a separate DCI, each indicating one or more than one of: QCL assumption (or assume same QCL with its respective PDCCH), bundling slot, scrambling ID, redundancy version, allocation, HARQ process number. Another one is one DCI or one PDCCH indicate one or more than one of each bundling unit: QCL assumption, bundling slot, scrambling ID, redundancy version, allocation.

For a PDCCH resource configuration (as exemplarily shown in FIG. 6), one case is that each of the more than one PDCCH transmission 101 corresponds to one CORESET (control resource set) configuration. And each CORESET configuration includes one or more of: CORESET ID, frequency domain resource, time duration in symbols, transmission configuration indicator (TCI) states, PDCCH DMRS scrambling ID, search space etc. The same scrambling ID can be used for the DMRS of more than one PDCCH transmission 101. And such same scrambling ID can serve for indicating the same packet 102 transmission 101 and can serve as a combination indication. Notably, a subset of the TCI states defined in TCI-States used for providing QCL relationships between the DL RS(s) in one RS Set e.g. (TCI-RS-Set) and the PDCCH DMRS ports.

Figure 6:
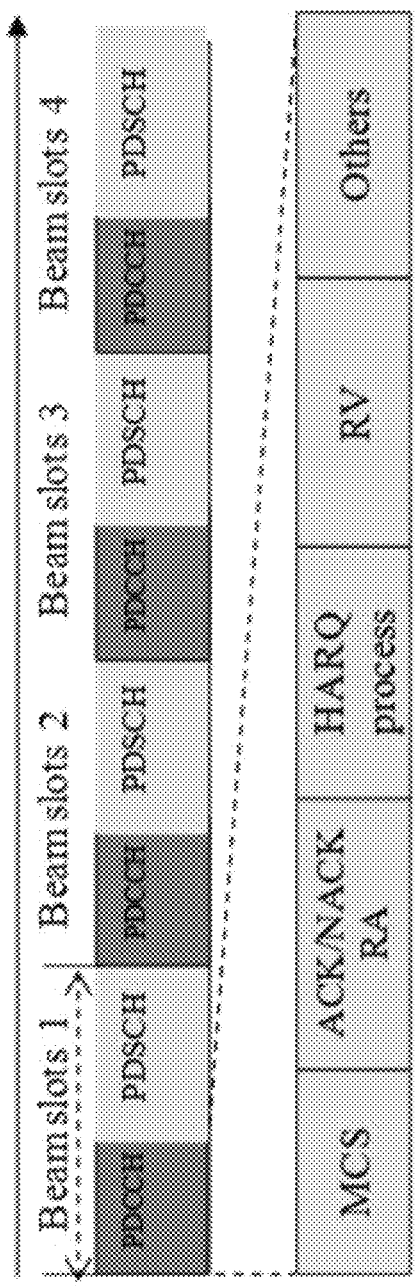
FIG. 6 shows an exemplary channel design for specifically beam slot bundling (multiple beam transmissions for the same packet)

As shown in FIG. 6, for unicast or multicast/group cast DCI transmitted by PDCCH, the content can include one of more of MCS, HARQ ACK/NACK resource allocation (RA), HARQ process, redundancy version, unicast or multicast/group cast indication, multicast/group cast identification.

Another case is that more than one PDCCH transmission 101 corresponds to one CORESET configuration. The CORESET configuration includes one or more of: CORESET ID, frequency domain resource of more than one PDCCH, time duration in symbols of more than one PDCCH, transmission configuration indicator (TCI) states of more than one PDCCH DMRS, PDCCH DMRS scrambling ID of more than one PDCCH.

Notably, when the multiple transmissions 101 have different control channel QCL assumptions based on one or more than one CORESET configuration, each transmission 101 can also have one or more than one control channel QCL assumption based on one or more than one CORESET configuration.

Note, each search space may correspond to one or more than one configured CORESET for PDCCH search or vice versa.

For physical channel transmission (as exemplarily shown in FIG. 7), another embodiment is dedicated PHY broadcast/multicast/groupcast channel. The more than one transmission 101 can be for the dedicated PHY channel e.g. PBCH or Physical Broadcast Multicast Channel (PBMCH). UE A received the configuration of the dedicated PHY channel, the configuration information includes one or more of frequency resource, time resource, RB or PRB resource, periodicity, MCS, QCL assumption of DMRS of dedicated channel, QCL assumption of dedicated channel, bundling size, bundling identification. The signaling can be PBCH, RRC signaling, MAC CE signaling, PDCCH signaling or the combination more than one of them.

Figure 7:
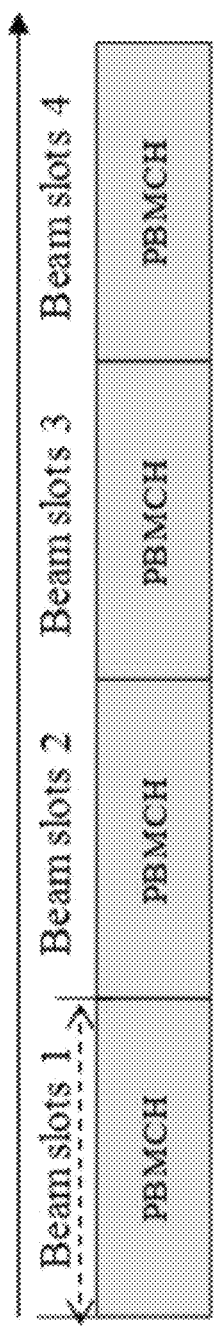
FIG. 7 shows an exemplary channel design for specifically beam slot bundling (multiple beam transmissions for the same packet).

FIG. 7 shows the dedicated channel-PBMCH transmission carrying the same packet 102 in more than one slot with more than one QCL assumption. Alternatively, the dedicated PHY channel with more than one transmission 101 can be the channel serving as reference QCL assumption e.g. PBCH. The receiving device 200 can make multiple transmission 101 combination based on the received information that are for the same packet 102. Such combination can be done without HARQ feedback from transmitting device 100.

Next, a feedback mechanism carried out by the receiving device 200 or another UE is described, in particular a feedback for more than one transmission 101, a feedback transmission with beamforming, and a feedback overhead reduction for groupcast communication.

When a receiving device 200 (also referred to as "UE A") receives the more than one transmission 101 of one packet 101 from a transmitting device (gNB and/or RSU and/or UE B), it may feedback ACK or NACK or both ACK and NACK information to the transmitting device 100 or UE B. Alternatively only ACK or only NACK or both ACK and NACK can be configured for feedback. The feedback information ACK or NACK or both ACK and NACK can be carried by PUCCH, PUSCH or RACH resources or more than one of their combinations. Further the feedback information can also include the beam or QCL reference information e.g. SSB or CRI, or UE identification information together with ACK or NACK or both ACK and NACK. Based on the feedback information, the transmitting device 100 or UE B can retransmit the data (packet 102) or make link adaptation for the transmission with efficiency improved.

Note, the QCL reference information may correspond to the QCL assumption of one or more than one transmission from the transmitting device to the receiving device e.g. QCL assumption parameter or type with SSB or CRI.

When there is more than one transmission 101 for one receiving device 200 for the same packet 102, the feedback transmission can be in one beam or in multiple beams. In other words, the feedback channel or DMRS of the feedback channel has one spatial relation with reference RS SSB or CSIRS or SRS, or more than one spatial relation with reference RS SSB or CSIRS or SRS.

The receiving device 200 can receive the signaling indicating one spatial relation or more than one spatial relation with the reference RS. Further the number of transmissions for the same feedback information can be indicated.

Alternatively, the receiving device 200 can assume that the feedback transmission has the spatial relation with SSB/PBCH selected by the receiving device 200 for PRACH association and transmission, if not configured. When there is more than one feedback transmission for the feedback information, if one spatial relation configured or assumed, the spatial relation of the first feedback transmission is assumed. In this way signaling can be reduced.

Notably, each feedback transmission or feedback resource of the feedback transmission for the same feedback content may correspond to one or more than one transmission 101 from the transmitting device 100 with different QCL assumptions.

In order to reduce the feedback overhead for group communication, a shared channel can be configured for each transmission 101 or each QCL assumption or each spatial relation. For the shared channel, the same feedback information in the same resource is transmitted from more than one receiving device 200. The resource can be configured as time resource or frequency resource or sequence. Further the shared resource can be PUCCH resource or PRACH resource or PUSCH resource. According to the previous discussion, the shared resource can be transmitted with one spatial relation or more than one spatial relation assumption. When both ACK and NACK are supported, separate resources for ACK and NACK feedback may be configured. Such a separation can prevent the collision of ACK and NACK from different receiving devices 200 in the same resource.

The feedback information and the resource or the shared channel carrying the feedback information can be exchanged between different transmitting devices 100. As the shared channel may carry the feedback information from more than one receiving device 200, the received power on the transmitting device 100 side may be high, which may cause interference to neighboring cells or transmitting devices 100. Through the shared channel related information exchanging among cells or transmitting devices 100, the neighboring cell or transmitting device 100 can decode and cancel such kind of interference.

Figure 8:
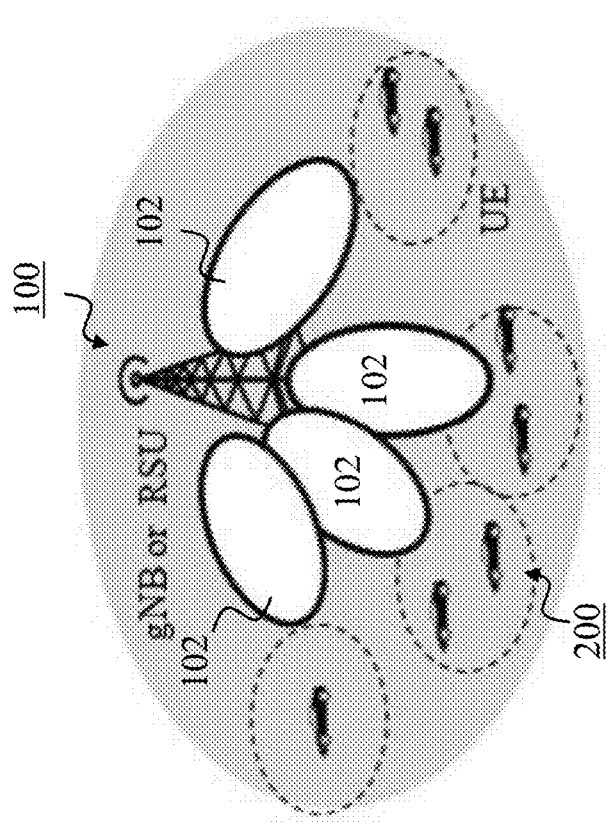
FIG. 8 shows multiple beam transmissions between a transmitting device (gNB/RSU/UE) according to an embodiment and a receiving device (UE) according to an embodiment.

An example is shown in FIG. 8. When a receiving device 200 (UE) receives data from a transmitting device 100 (gNB or RSU and/or UE) via more than one transmission 101 (here beams), it can feedback ACK or NACK in the shared channel. The shared channel can be transmitted in one beam transmission or multiple beams. In other word, the shared channel is transmitted according to one spatial relation or more than one spatial relation with the configured reference RS.

Figure 8A:
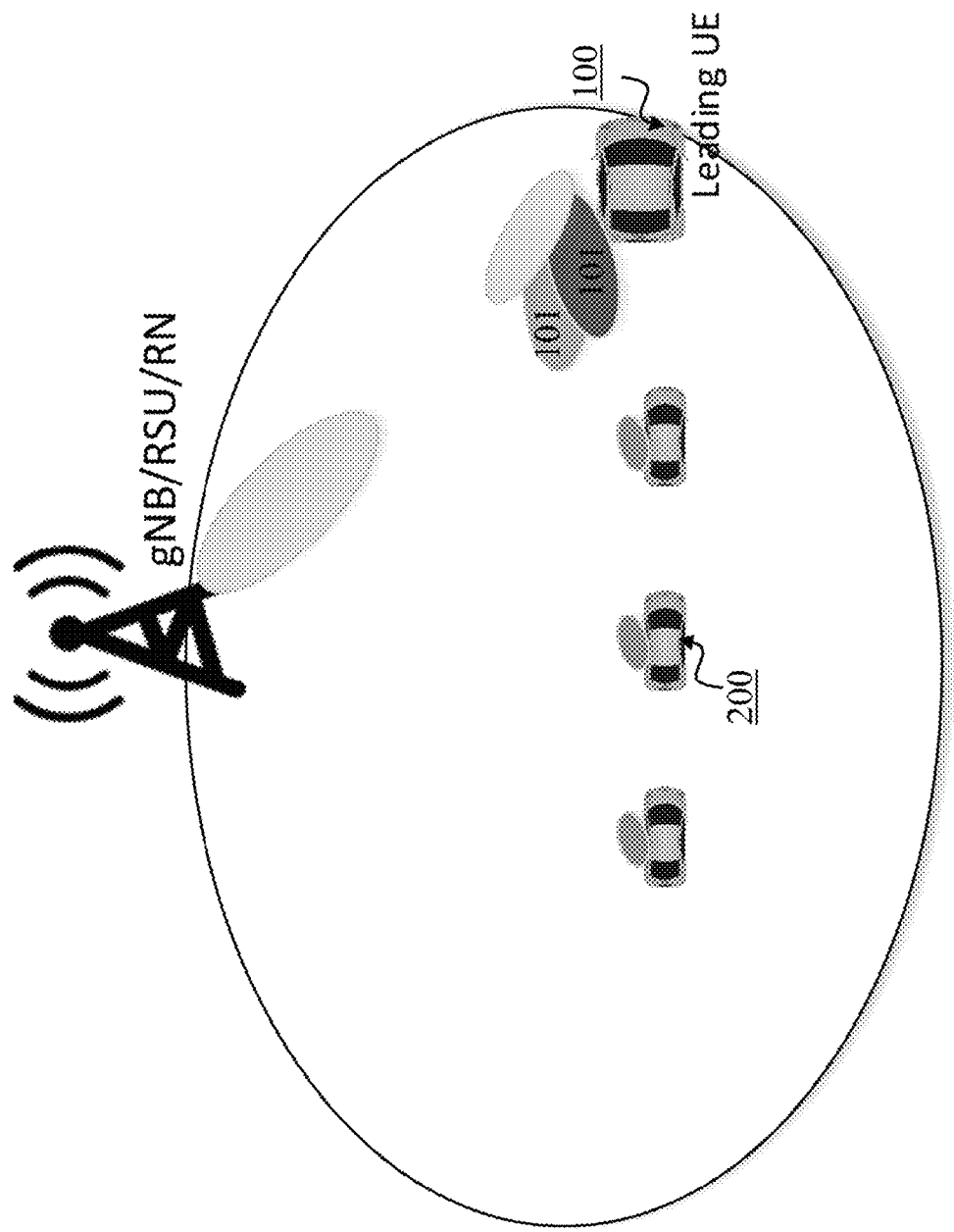
FIG. 8A shows multiple beam transmissions between a transmitting device (UE) according to an embodiment and a receiving device (UE) according to an embodiment.

An example is shown in FIG. 8A. When a receiving device 200 (UE) receives data from a transmitting device 100 (UE e.g. leading UE) via more than one transmission 101 (here beams), it can feedback ACK or NACK in the shared channel. The shared channel can be transmitted in one beam transmission or multiple beams. In other word, the shared channel is transmitted according to one spatial relation or more than one spatial relation with the configured reference RS. Note RN means relay node in the figure.

The feedback spatial relation assumption and the shared channel were discussed before. On the feedback timing, especially for the HARQ-ACK/NACK, there are two options for UE group specific or UE specific reference time slot(or time unit)+time offset for HARQ feedback Option 1: A reference slot is the slot that has a QCL assumption with SSB used for initial access or during initial access or configured CRI or after initial access.

Option 2: A reference slot is the last slot in the bundling.

The Option 1 UE group specific or UE specific reference time for feedback is helpful for early feedback and early retransmission. Option 2 has the benefit of simplicity if the last slot is not signaled.

Another exemplary embodiment may include that the feedback information can be received by the receiving device 200 (UE A) from another receiving device 200 (UE B). UE B can make the retransmission when it receives NACK. Alternatively, UE B can aggregate or concatenate the feedback information and send to the transmitting device 100 (node A) according to configuration or when UE B does not correctly receive data from node A.

The feedback transmission configuration for UE B reception can include one or more of: the feedback timing, the resources for the feedback, the feedback associated data's HARQ process, the feedback associated data's redundancy version etc.

The feedback information or content can include one or more of: ACK or NACK or both ACK and NACK, the data/packet DMRS antenna port associated QCL reference information e.g. QCL assumption with SSB or CRI, the associated UE identification information, UE's RNTI, the timing it received the packet/data, the resources it received the packet/data.

Figure 9:
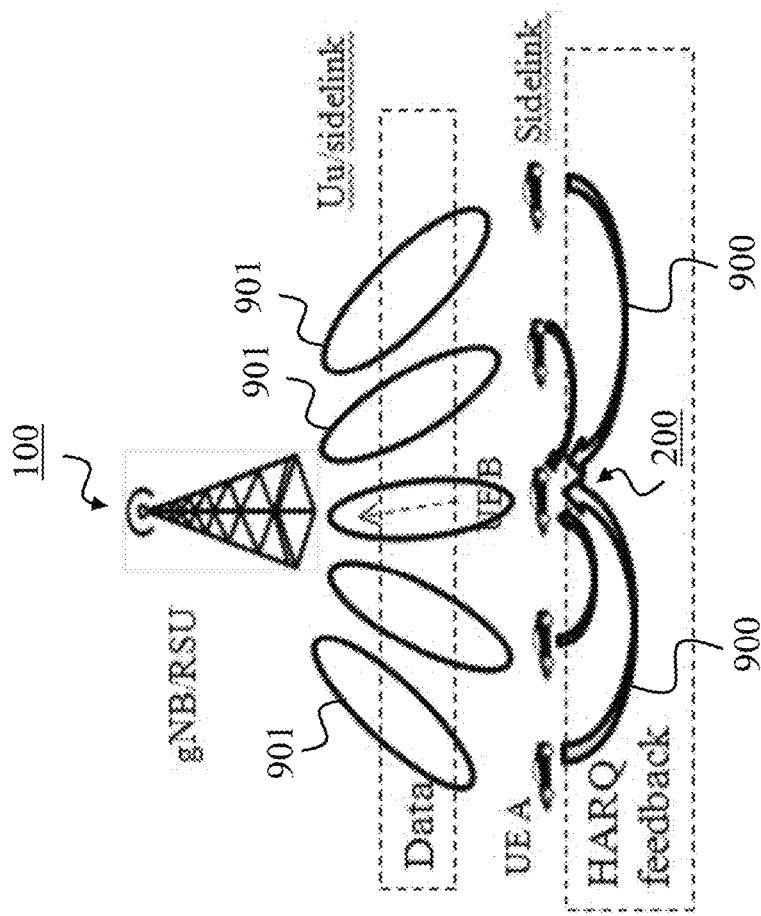
FIG. 9 shows an example of a feedback mechanism from one or more receiving devices (UEs) according to an embodiment to another receiving device or to a transmitting device (gNB/RSU/UE) according to embodiments.

As one example, FIG. 9 shows a cross link transmission. A transmitting device 100 (gNB or RSU) transmits group information to more than one receiving device 200 (UEs e.g. UE A and UE B) and/or a transmitting device 100 (UEs e.g. UE B) transmits group information to more than one receiving device. UE A and UE B belong to the same group. UE B is the selected/configured UE responsible for communication with gNB or RSU representing the group. UE B can be selected as the leading UE e.g. due to its better channel condition with gNB or RSU in the group. The same packet 102 is transmitted in different transmissions 101 (here beams) to UE A and UE B, respectively. And/or the same packet 102 is transmitted from UE B in different transmissions 101 (here beams) to UE A. UE A can feedback ACK or NACK or both ACK and NACK to UE B. Such a kind of feedback 900 and the resources for the feedback 900 can be configured by gNB or RSU or UE B. When UE B gets the feedback information 900 from UE A, it can retransmit the packet 102 when NACK is received from UE A. Alternatively UE B can concatenate or aggregate the feedback information 900 from different UE to gNB or RSU according to configuration or when UE B does not correctly receive data from node A, and can send the feedback information 900 in one or more transmissions 901 to the gNB or RSU. Accordingly, the gNB or RSU can make their retransmission.

Figure 9A:
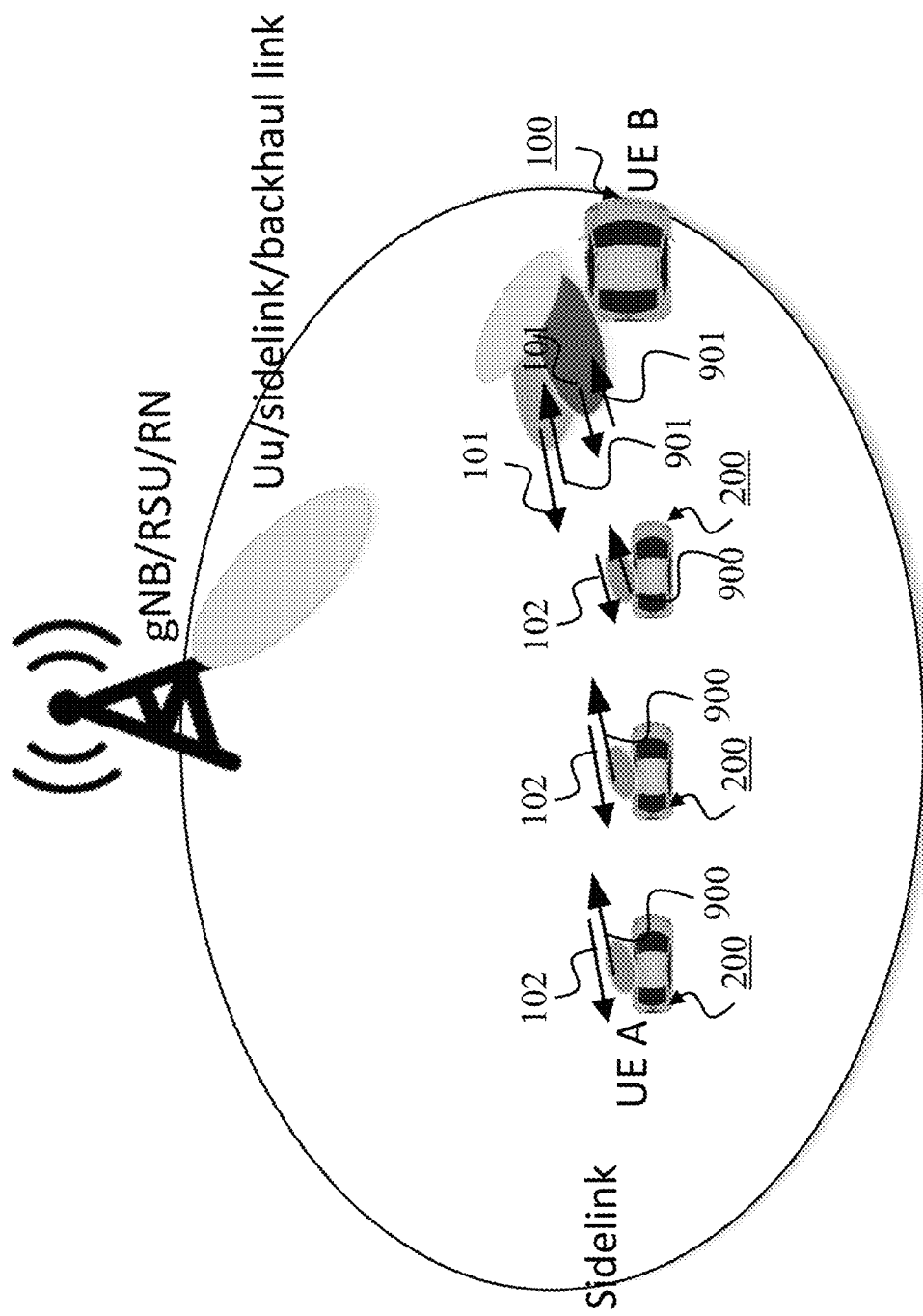
FIG. 9A shows an example of a feedback mechanism from one or more receiving devices (UEs) according to an embodiment to another receiving device or to a transmitting device (UE) according to embodiments.

As one example, FIG. 9A shows a cross link transmission. A transmitting device 100 (UE B) transmits group information to more than one receiving device 200 (UEs e.g. UE A). UE A and UE B belong to the same group. UE B is the selected/configured UE responsible for communication with gNB or RSU representing the group. UE B can be selected as the leading UE e.g. due to its better channel condition with gNB or RSU in the group. The same packet 102 is transmitted from UE B in different transmissions 101 (here beams) to UE A. UE A can feedback ACK or NACK or both ACK and NACK to UE B. Such a kind of feedback 900 and the resources for the feedback 900 can be configured by gNB or RSU or UE B. When UE B gets the feedback information 900 from UE A, it can retransmit the packet 102 when NACK is received from UE A. Alternatively UE B can concatenate or aggregate the feedback information 900 from different UE to gNB or RSU according to configuration or when UE B does not correctly receive data from node A, and can send the feedback information 900 in one or more transmissions 901 to the gNB or RSU. Accordingly, the gNB or RSU can make their retransmission. Note RN means relay node in the figure. The link between gNB/RSU/RN and UE B (or leading UE, leading vehicle) can be Uu link/sidelink/backhaul link.

Next, the overall procedure as implemented by the transmitting device 100 and the receiving device 200 is described.

Figure 10:
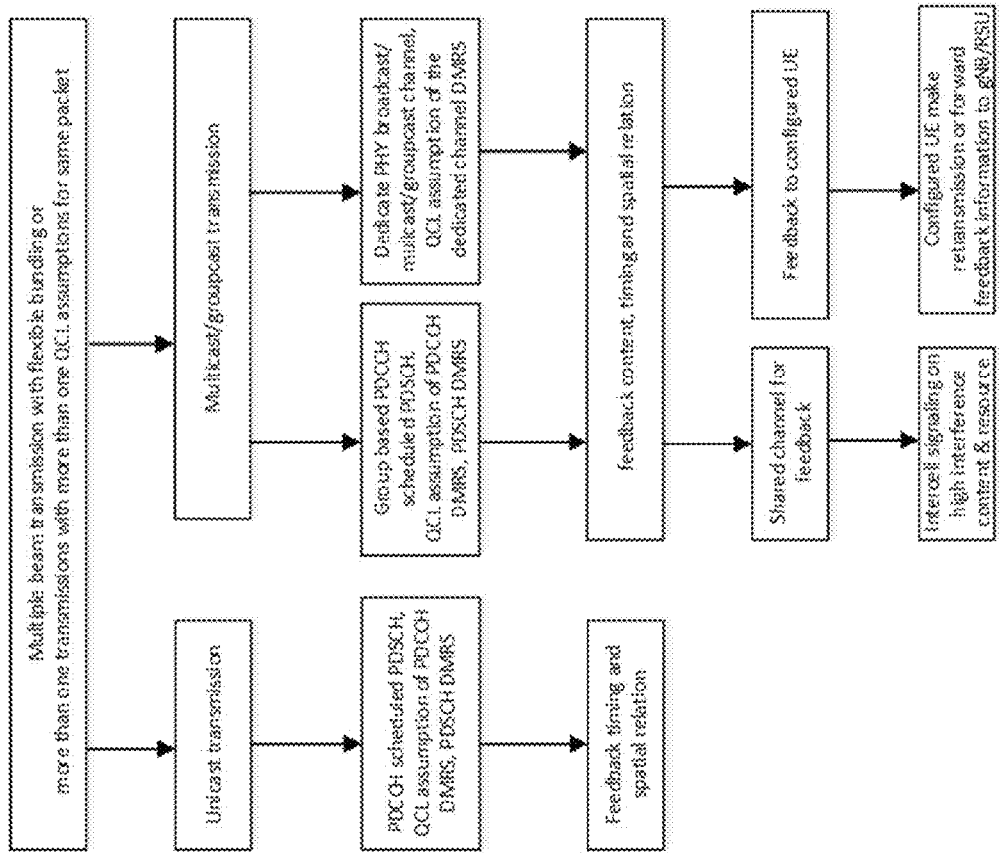
FIG. 10 shows an exemplary overall procedure as carried out by a transmitting device and a receiving device according to embodiments.

FIG. 10 shows an overall all procedure including the transmission and feedback part implemented by the transmitting device 100 and the receiving device 200, respectively. Note that as discussed above, some components can be independent or optional in the whole procedure. For example, multiple beam transmissions 101 or multiple QCL assumptions and the bundling can be optional. Unicast transmission or multicast or groupcast or even broadcast transmission can all be one option. For the feedback 900, it can have one spatial relation assumption or multiple spatial relation assumptions. Also for the feedback 900, there can be shared channel feedback or cross link feedback.

Figure 11:
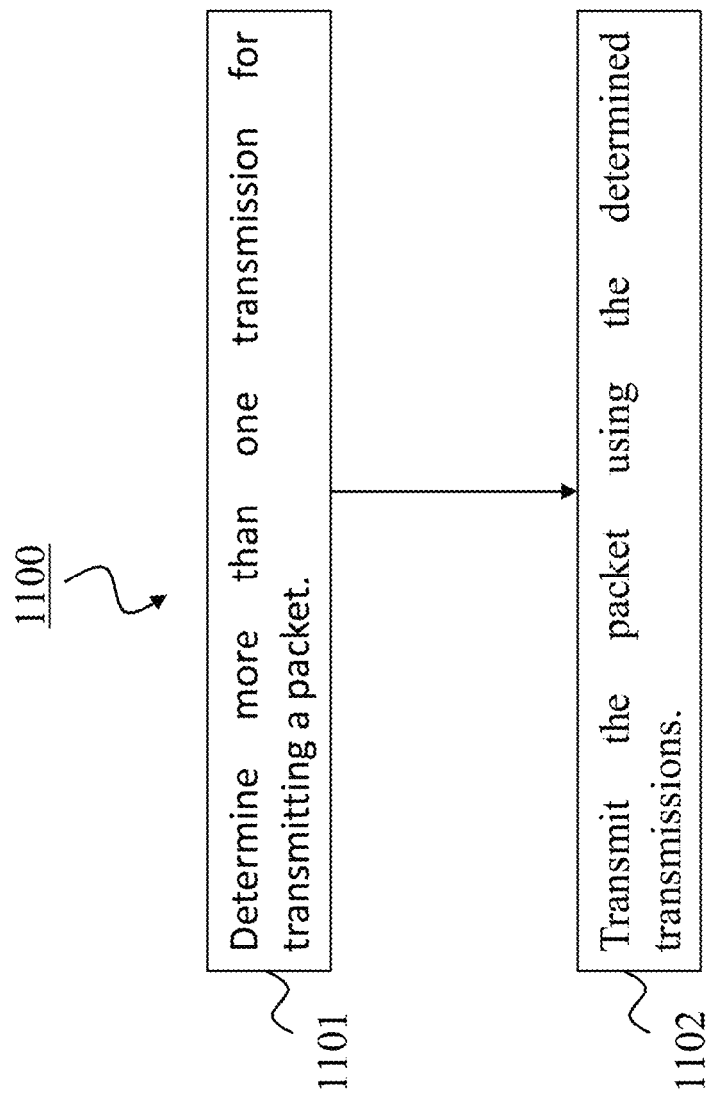
FIG. 11 shows a transmitting method according to an embodiment.

FIG. 11 shows a transmitting method 1100 according to an embodiment, in particular for wireless communications. The transmitting method 1100 may be carried out by the transmitting device 100 as shown in FIG. 1. The transmitting method 1100 comprises: determining 1101 more than one transmission 101 for transmitting a packet 102, and transmitting 1102 the packet 102 using the determined transmissions 101.

Figure 12:
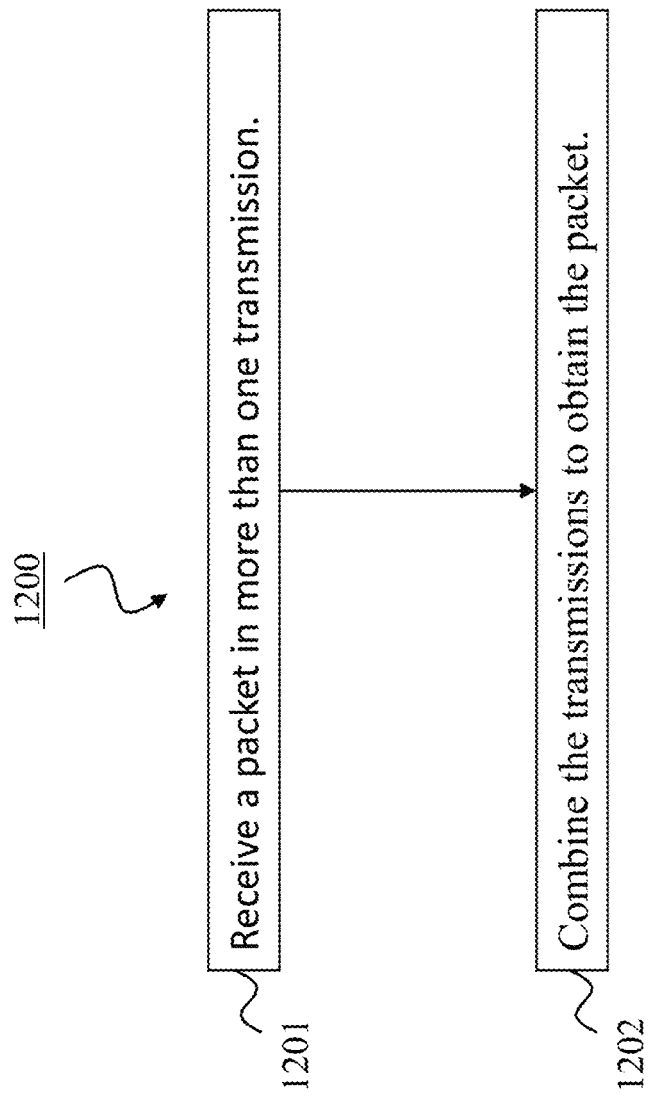
FIG. 12 shows a receiving method according to an embodiment.

FIG. 12 shows a receiving method 1200 according to an embodiment, in particular for wireless communications. The receiving method 1200 may be carried out by the receiving device 200 shown in FIG. 2. The receiving method 1200 comprises a step 1201 of receiving a packet in more than one transmission 101, and a step 1202 of combining the transmissions 101 to obtain the packet 102.

The present disclosure has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A transmitting device for wireless vehicle-to-X (V2X) communications, the transmitting device comprising:
a processor configured to determine a bundle of multiple downlink transmissions each for transmitting a packet, each respective transmission of the bundle of multiple downlink transmissions being a respective beam transmission to which is allocated a different respective beam slot, wherein the processor is configured to determine, for the bundle of multiple beam transmissions for transmitting the packet, a number of the multiple beam transmissions, a periodicity of the multiple beam transmissions, and a spatial relationship between one or more antenna ports from which the multiple beam transmissions are to be transmitted; and
a transceiver configured to transmit, to a receiving device and/or a group of receiving devices using the determined multiple transmissions.

2. The transmitting device according to claim 1, the processor is configured to determine the number of the multiple beam transmissions depending on whether the packet is initially transmitted or is retransmitted to the receiving device and/or the group of receiving devices.

3. The transmitting device according to claim 1, wherein each respective beam slot is assigned a resource set that includes one or more of: a time resource, a frequency resource, a code resource, a spatial resource.

4. A receiving device for wireless vehicle-to-X (V2X) communications, the receiving device comprising:
a transceiver configured to receive a packet in each of multiple respective transmissions of a bundle of downlink transmissions from a transmitting device, each respective transmission being a respective beam transmission to which is allocated a different respective beam slot, and
a processor configured to, based on a number of the multiple beam transmissions, a periodicity of the multiple beam transmissions, and at least one quasi co-location (QCL) assumption for the multiple beam transmissions, combine the multiple beam transmissions and/or decode at least one respective beam transmission to obtain the packet.

5. The receiving device according to claim 4, wherein the transceiver is further configured to send feedback information for the packet to the transmitting device or to another receiving device in a determined resource.

6. The receiving device according to claim 5, wherein the feedback information includes an acknowledgement (ACK) and a negative-acknowledgment (NACK), wherein the ACK and the NACK are allocated to different resources.

7. The receiving device according to claim 5, wherein the feedback information includes:
- an ID of the receiving device or an ID of a group of receiving devices the receiving device belongs to, and/or
- Quasi Co-Location (QCL) reference information.

8. The receiving device according to claim 5, wherein the transceiver is further configured to send the feedback information on a channel and/or resource shared with other receiving devices to the transmitting device.

9. The receiving device according to claim 5, wherein the transceiver is configured to receive feedback information from at least one other receiving device, and
- wherein the processor is further configured to aggregate and/or concatenate feedback information received from a first other receiving device with own feedback information and/or with feedback information received from a second other receiving device, and
- wherein the transceiver is further configured to send the aggregated and/or concatenated feedback information to the transmitting device or another receiving device.

10. The receiving device according to claim 9, wherein the transceiver is further configured to receive signaling that indicates whether to send the aggregated and/or concatenated feedback information to the transmitting device or to the other receiving device.

11. The receiving device according to claim 5, wherein the transceiver is configured to receive feedback information including a negative-acknowledgement (NACK) or an acknowledgement (ACK) and/or a corresponding index from at least one other receiving device, and
- wherein the processor is further configured to aggregate and/or concatenate the NACK or the ACK and/or the corresponding index and send the aggregated and/or concatenated feedback information to the transmitting device or other receiving device.

12. The receiving device according to claim 5, wherein the transceiver is further configured to send the feedback information according to a reference timing,
- wherein the reference timing includes at least one element selected from the group of elements consisting of:
- a predefined time resource,
- a first time resource that is allocated to the more than one transmission,
- a time resource wherein the transmitted channel and/or signal of the time resource is quasi co-located with a channel and/or a signal identified during initial access and/or after initial access, or
- a time resource allocated to the last received transmission of the more than one transmission.

13. The receiving device according to claim 5, wherein the feedback information includes an acknowledgement (ACK) or a negative-acknowledgment (NACK) or includes ACK and NACK, and
- wherein the determined resource is at least one of:
- a common preamble sequence,
- a common Physical Uplink Control Channel (PUCCH) resource, or
- a common Physical Uplink Shared Channel (PUSCH) resource for the receiving device and at least one other receiving device.

14. The receiving device according to claim 13, wherein, when the feedback information includes ACK and NACK, the transceiver is configured to transmit the feedback information using at least one of:
- different common preamble sequences,
- different common PUCCH resources, or
- different common PUSCH resources.

15. The receiving device according to claim 4, wherein each respective beam slot is assigned a resource set that includes one or more of: a time resource, a frequency resource, a code resource, a spatial resource.

* * * * *